Dec. 5, 1967  J. S. GOLIGHTLY  3,356,480
METHOD FOR BENDING GLASS SHEETS
Filed Feb. 25, 1963  12 Sheets-Sheet 1

INVENTOR
JAMES S. GOLIGHTLY

Oscar L. Spencer
ATTORNEY

Dec. 5, 1967 J. S. GOLIGHTLY 3,356,480
METHOD FOR BENDING GLASS SHEETS
Filed Feb. 25, 1963 12 Sheets-Sheet 2

INVENTOR
JAMES S. GOLIGHTLY
BY Osarh Spencer
ATTORNEY

Dec. 5, 1967 J. S. GOLIGHTLY 3,356,480
METHOD FOR BENDING GLASS SHEETS
Filed Feb. 25, 1963 12 Sheets-Sheet 3

INVENTOR
JAMES S. GOLIGHTLY
Oscar L. Brenner
ATTORNEY

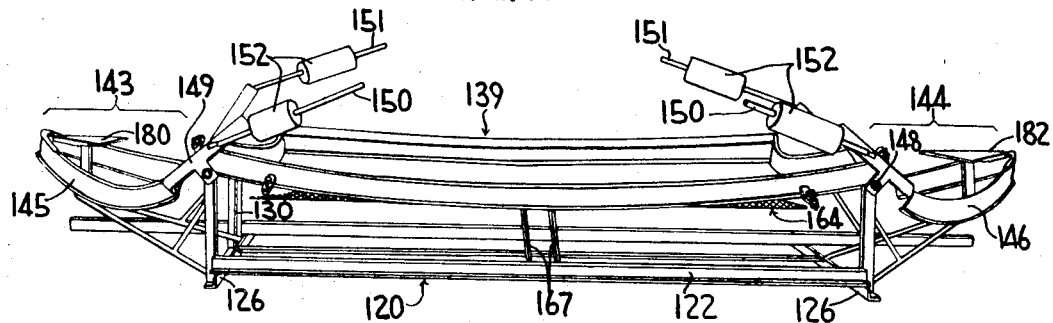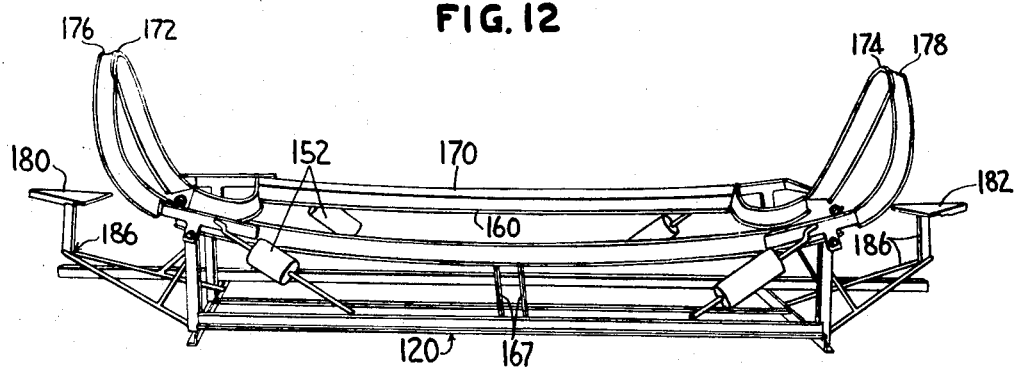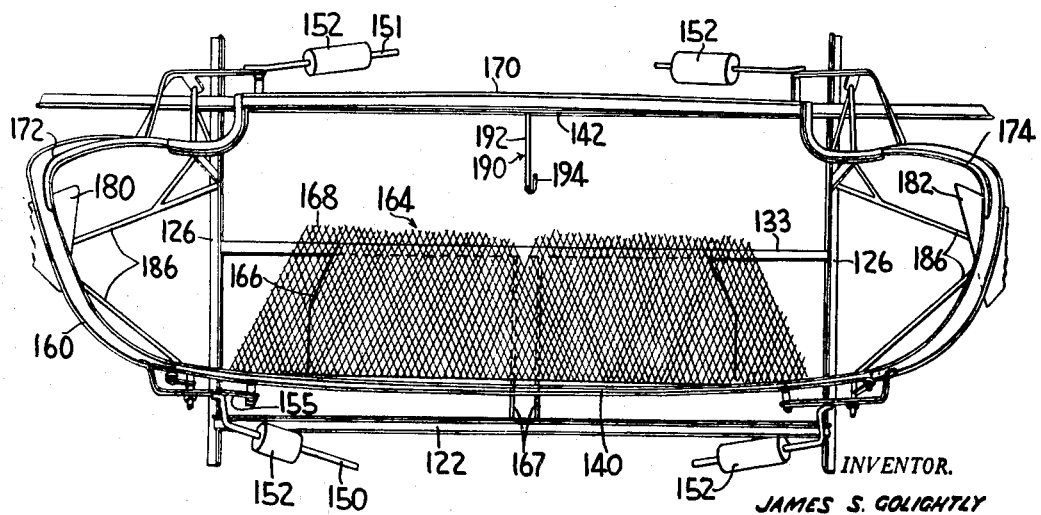

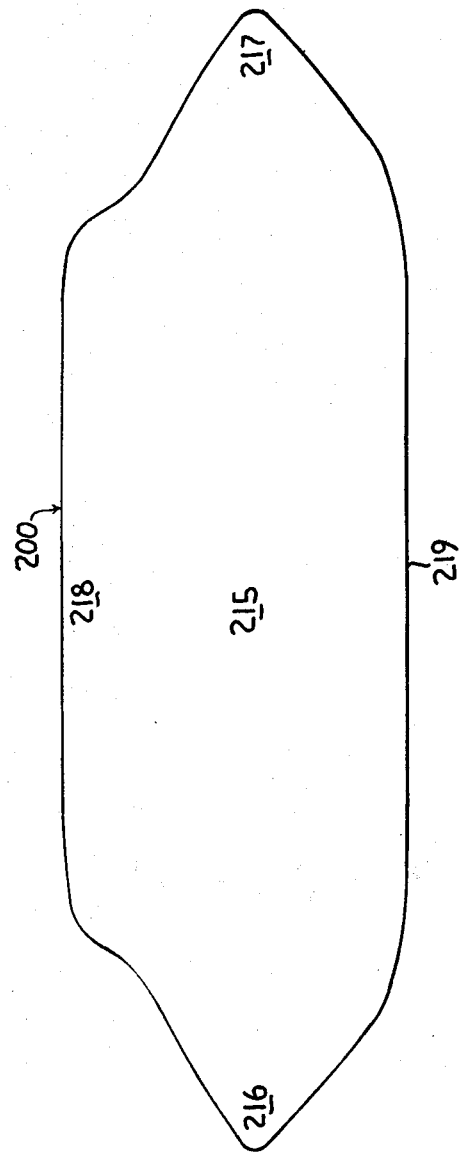

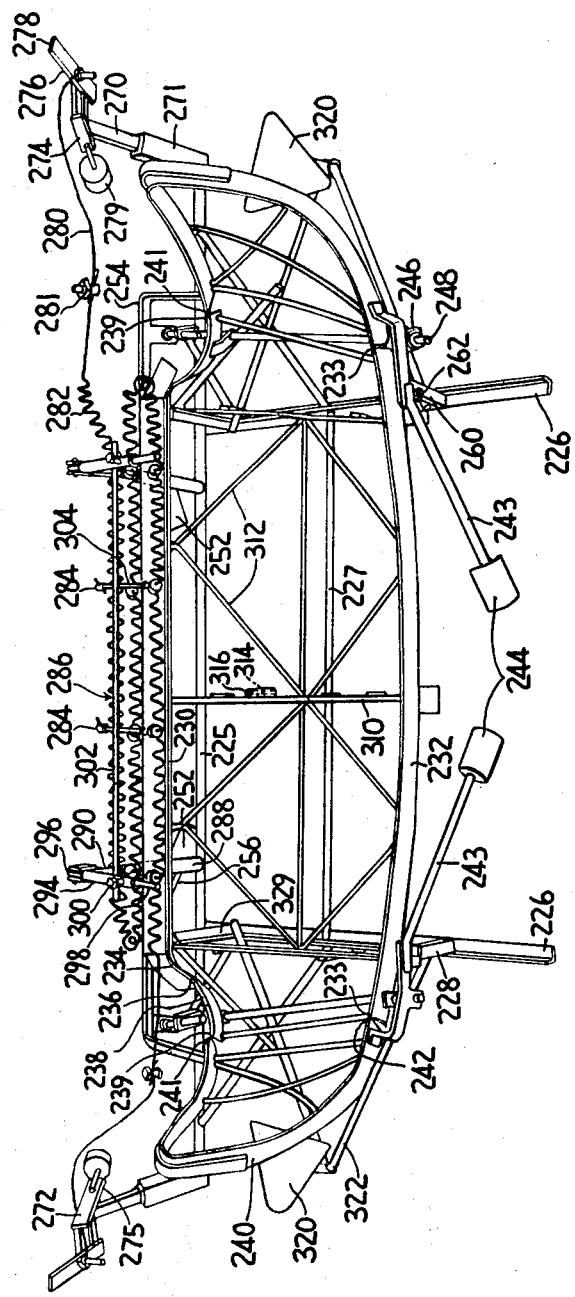

Dec. 5, 1967  J. S. GOLIGHTLY  3,356,480
METHOD FOR BENDING GLASS SHEETS
Filed Feb. 25, 1963  12 Sheets-Sheet 7

INVENTOR
JAMES S. GOLIGHTLY
BY
Oscar L. Spencer
ATTORNEY

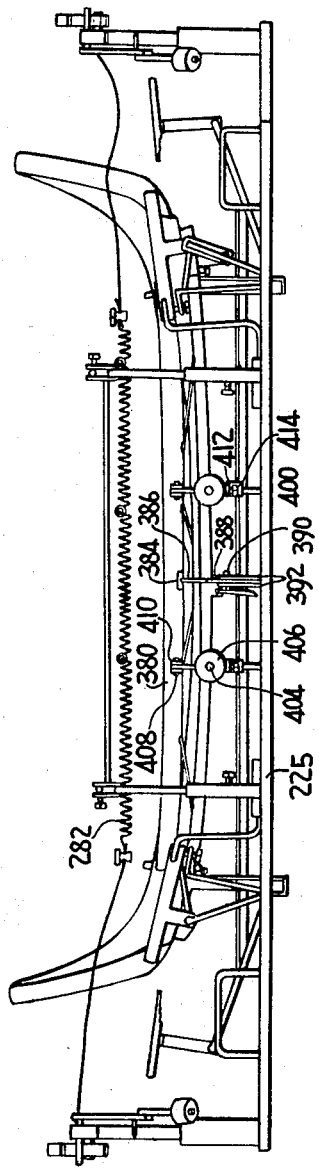

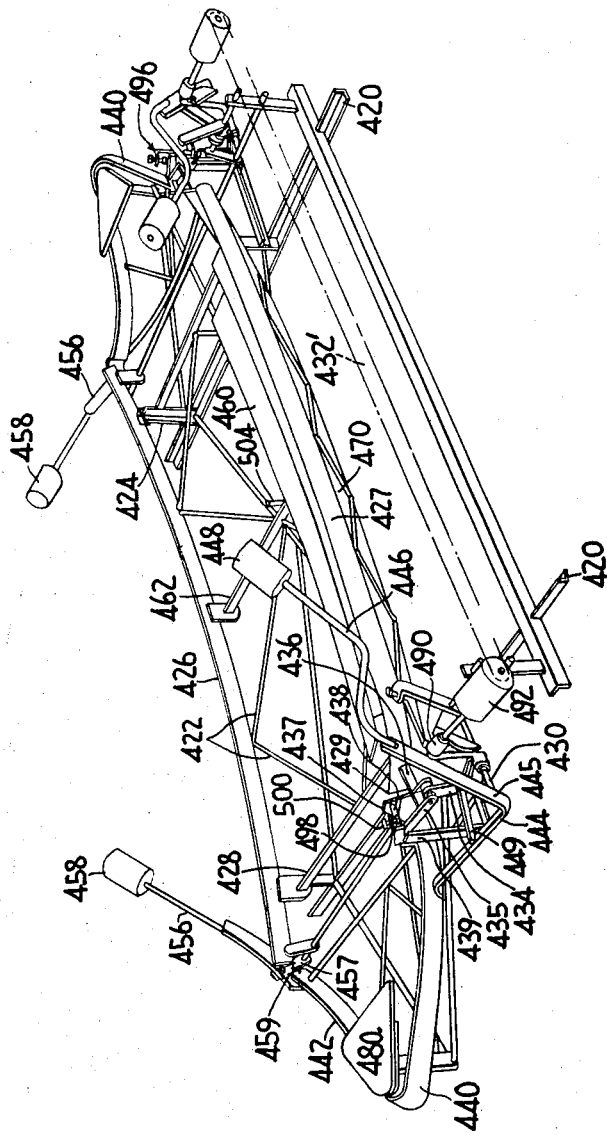

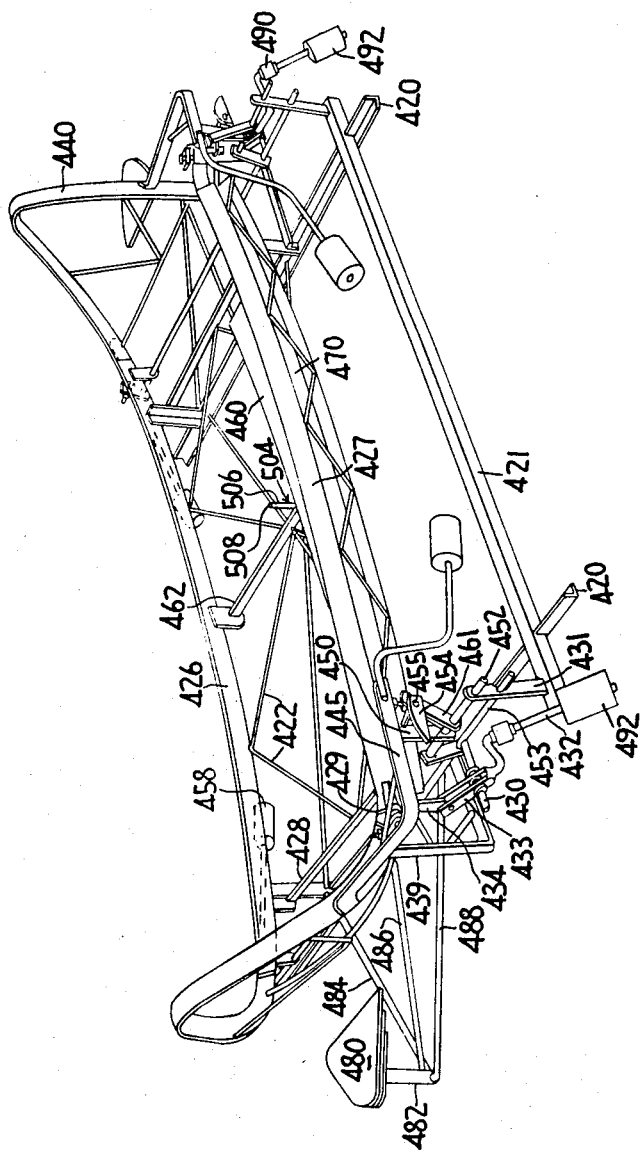

Dec. 5, 1967  J. S. GOLIGHTLY  3,356,480
METHOD FOR BENDING GLASS SHEETS
Filed Feb. 25, 1963  12 Sheets-Sheet 11

GLASS FLAT

LONGITUDINAL BEND COMPLETE

COMPOUND BEND COMPLETED

INVENTOR.
JAMES S. GOLIGHTLY
BY
Oscar L. Spencer
ATTORNEY

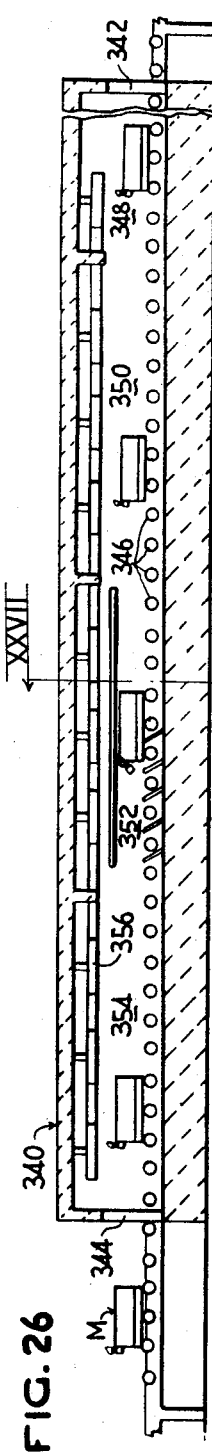

United States Patent Office 3,356,480
Patented Dec. 5, 1967

3,356,480
METHOD FOR BENDING GLASS SHEETS
James Sidney Golightly, Fox Chapel, Pa., assignor to Pittsburgh Plate Glass Company, Pittsburgh, Pa., a corporation of Pennsylvania
Filed Feb. 25, 1963, Ser. No. 260,384
4 Claims. (Cl. 65—103)

ABSTRACT OF THE DISCLOSURE

Bending glass sheets to non-uniform shapes comprising abstracting or absorbing a different amount of heat from each of two contiguous areas while heat sagging the sheet into conformity with an outline mold which may include concentrating heat along an area from which substantially no heat is absorbed and bending the sheets about both their longitudinal and transverse axes to produce a compound bend by conveying the sheets transversely to their length through a hot region having a non-uniform temperature pattern transverse to the path the glass sheets take through said region. The compound bending, according to one embodiment, is characterized by commencing heat concentration along a longitudinal area after bending about a transverse axis is substantially completed.

---

This application is a continuation-in-part of application Ser. No. 735,736 of James S. Golightly, filed May 16, 1958, for "Bending Glass Sheets," which became abandoned on May 31, 1963, and which is a continuation-in-part of application Ser. No. 438,016 of James S. Golightly and William C. McRoberts, filed June 21, 1954, entitled, "Glass Bending Molds," which issued as U.S. Patent No. 2,876,595 on Mar. 10, 1959. This application refers to application Ser. No. 75,652 of James S. Golightly, Wavid H. Doehlert, and Charles R. Davidson, Jr., filed Nov. 25, 1960, for "Method of Bending Glass Sheets to Compounds Curvatures," which issued as U.S. Patent No. 3,223,505 on Dec. 14, 1965, which is a division of application Ser. No. 531,461 of James S. Golightly, David H. Doehlert, and Charles I. Davidson, Jr., filed Aug. 30, 1955, for "Method and Apparatus for Bending Glass Sheets to Compound Curvatures", which became abandoned on Apr. 18, 1961. Also, this application refers to application Ser. No. 785,893 of James S. Golightly and Harold E. McKelvey, filed Jan. 9, 1959, for "Method and Apparatus for Bending Glass Sheets to Compound Curvatures," which issued as U.S. Patent No. 3,248,195 on Apr. 26, 1966, which is a continuing application of application Ser. No. 531,462 of James S. Golightly and Harold E. McKelvey, filed Aug. 30, 1955, for "Method and Apparatus for Bending Glass Sheets to Compound Curvatures" which became abandoned on Jan. 26, 1959.

The present invention involves a method of bending a glass sheet about the longitudinal axis thereof. The method of the present invention is accomplished by moving the sheet transversely through a furnace while engaging the marginal periphery of the sheet with the upper surface of a shaping rail, directing radiant heat at the sheet to heat said sheet, concentrating radiant heat upon a longitudinal area of the sheet spaced inwardly from the longitudinal marginal edges of said sheet to sag said longitudinal area below the upper surface of said shaping rail, and controlling the sag by withdrawing heat from the furnace atmosphere adjacent a surface of the sheet in an area adjacent said longitudinal sheet area.

The present invention in its broader aspects concerns improvements in a method of bending glass sheets employing skeleton-type bending molds facilitating bending of flat glass sheets into complex curvatures wherein the radius of curvature of the bent glass sheets varies both longitudinally and transversely thereof.

Conventionally, sheets of flat glass have been bent into desired windshield patterns by cutting the flat sheets into the shape desired for the finished product, supporting the sheets upon a bending mold, and gradually heating the glass and the mold to avoid thermal shock, thus softening the glass. The glass, softened by heat, conforms to the curvature of the mold.

Due to the increased size and complexity of curved windshields and backlights presently desired by automobile manufacturers, it has become necessary to complicate the structure of molds required to bend glass. A typical example of the complex curvatures required is a windshield bent to a comparatively shallow curvature in its central portion merging into regions of rapidly reducing radii of curvature to form opposing wing sections. In a plane substantially perpendicular to the plane of the major portion of the glass sheet, one transverse end of these wing sections is curved and the other transverse end is substantially flat so that the wing sections are twisted transversely of the longitudinal axis of the sheet.

Further complicated structures involve the so-called "twin wrap" windshield in which the windshield is not only bent longitudinally about its transverse axis to form end portions bent with respect to its central portion but also is provided with a transverse localized bend to form an auxiliary portion that extends into the roof of the vehicle and is bent transversely about its longitudinal axis with respect to its central portion.

Many difficulties are encountered in bending glass sheets in two mutually perpendicular directions along axes having varying radii. Glass must be stretched unevenly during the bending operation, thereby causing optical distortion. In stretching glass in two mutually perpendicular directions, additional distortion is bound to occur. Furthermore, difficulties are encountered in reproducing such compound bends, especially when the windshields are produced at mass-production rates.

When longitudinal and transverse bends are imparted to glass sheets in a noncontinuous operation, such a process is too slow for mass production. It is far superior to perform the bending operation by a continuous process wherein flat glass sheets are mounted on a bending mold, conveyed continuously through a bending lehr heated to produce a hot atmosphere sufficient to soften the glass and removed from the lehr in the compound shape desired.

Various apparatus for performing the present invention are essentially skeleton-type bending molds comprising a skeleton framework defining a shaping surface conforming to the ultimate shape desired for the bent glass sheets and encompassing an area including one or more relatively flat portions. The apparatus is adapted for use in transporting glass sheets through a bending lehr provided with glass sheet heating means located above the path of movement of said shaping surface and further including heat absorbing means located below said shaping surface in substantial alignment with the one or more relatively flat portions of the area. The heat absorbing means comprise one or more members of high thermal capacity compared to that of an equivalent area of the adjacent glass to be maintained relatively flat.

In bending glass sheets where the opposite sides of the longitudinal extremities of the glass are bent to different curvatures, it has been found necessary to impart different degrees of heat to different localized portions of the glass.

Since continuous bending of glass is accomplished by conveying the glass sheets sideways through a bending lehr where heat is applied to flat glass sheets supported on the open mold, it is possible to vary the degree of heat applied to the glass passing through the lehr along the longitudinal but not the transverse axis of the glass by supplying localized heat of different intensity at different locations transversely of the bending lehr. A particular mold shown in FIGS. 1 to 5 is designed to maintain the shape of one side edge of the glass sheet flat and to curve the other side edge.

A glass bending device or mold for performing the present invention includes a central molding member comprising a pair of spaced side rails and outboard molding members movable relative to the central molding member. Means is provided for imparting heat to a longitudinally extending, critical portion of glass carried between the side rails at a greater intensity than other portions extending longitudinally of the sheet to assist the transverse bend. This means or heat-imparting member may comprise an electrical heating element attached to the support structure and movable into a position overlying the longitudinally extending portion of glass when the glass sheet is mounted on the mold for bending, or a smoothly surfaced sheet of heat reflective material carried by the mold support structure beneath the critical portion.

In the embodiment containing an electrical heating element, the latter in the form of a longitudinally extending open coil is attached at each end to a trolley electrode. The coil is mounted on a pivotable frame adapted for movement of the coil over the longitudinally extending portion of the glass sheet defining the axis of most severe transverse bending.

The electrodes move with the mold through a bending lehr and, at the proper portion of the bending cycle, movably engage a pair of bus bars mounted in the lehr. A potential difference is maintained between the bus bars. An electric voltage is impressed across the heating coil during the time the electrodes contact the bus bars. The coils radiate heat to the longitudinally extending portion of the glass sheet during passage of the mold through the portion of the bending lehr where contact is maintained between the electrodes and bus bars. The transverse bending of a critical area of glass may be effected by such apparatus independently of the longitudinal wrap-around bend produced by adjustment of overhead lehr heaters to provide a varying heat intensity pattern longitudinally of the sheet.

Counterweighting the outboard molding members, which pivot relative to the central molding member, assists the heat-softened glass to assume a complex longitudinal bend.

For compound bends including less severe transverse bends, it is possible to dispense with the electrical heating coils entirely and provide the localized heating needed for the transverse bend by placing a smoothly surfaced, rigid sheet of heat reflective material immediately outside the reversely curved side rail. The rigidity of the sheet enables it to help support the flat glass sheet prior to bending, and its smoothness facilitates sliding of the sheet during bending and reflection of heat from overhead lehr heaters into the critical longitudinal strip of glass it underlies.

Still another embodiment of apparatus for accomplishing the present invention utilizes a longitudinally extending sheet of heat reflective material attached to a mold support structure and located between the laterally spaced shaping rails of the central mold section underneath the portion of the glass sheet to be bent sharply about an axis extending longitudinally thereof and beneath the upper shaping surfaces of the spaced rails.

All the above embodiments may be provided with heat absorbing members where needed to control the sag in the supported glass sheet in the vicinity of the position occupied by the glass sheet portion after sagging.

Prior art bending molds have attempted to use shields interposed between a source of heat and a portion of a flat glass sheet to be maintained relatively flat. Pearse et al. Patent No. 2,450,297, Paddock et al. Patent No. 2,452,488, and Bamford et al. Patent No. 2,646,647 show typical constructions of this type. However, when such molds are employed to bend glass sheets in pairs to non-uniform curvatures by shielding the relatively flat portions, the upper sheet of the pair softens less readily than the bottom sheet and intimate contact between the sheets is lost. Gaps remain between critical portions of the bent pair of sheets. These gaps are so great that they cannot be removed by laminating the glass sheets to opposite surfaces of a plastic interlayer. The same problem arises when employing shields both above and below the critical portions of a glass sheet, as depicted in Bamford et al. Patent No. 2,646,647 and Boyles et al. Patent No. 2,348,278, in attempts to bend a pair of aligned glass sheets simultaneously.

According to the present invention, special molds are provided for bending glass sheets in pairs to produce these unique bends while avoiding gaps between the facing surfaces of the sheets of the pair. These molds are essentially skeleton type bending molds comprising a skeleton framework defining a shaping surface conforming to the ultimate shape desired for the bent glass sheets and encompassing an area including one or more relatively flat portions, the apparatus being adapted for use in transporting glass sheets through a bending lehr provided with glass sheet heating means located above the path of movement of said shaping surface only and further including heat absorbing means located only below said shaping surface in substantial alignment with the one or more relatively flat portions of the area. The heat absorbing means comprise one or more members of high thermal capacity compared to that of an equivalent area of the adjacent glass to be maintained relatively flat.

A principal object of the present invention is to provide a method of bending flat glass sheets into complex curvatures where the glass is curved both longitudinally and transversely.

Another object of the present invention is to bend glass sheets about their axes extending transversely of their path of movement through a hot atmosphere whose temperature is sufficiently high to cause the glass sheets to soften into conformity with the shaping surfaces of the molds upon which the glass sheets are supported.

Still another object of the present invention is to provide a method for bending glass sheets in pairs to non-uniform curvatures wherein the glass sheets are bent in unison without forming gaps between the opposing surfaces of the glass sheets comprising the stack.

These and other objects of the present invention will be understood in the light of the following description. In the drawings forming part of the description wherein like reference numbers refer to like structural elements, FIG. 1 is a plan view of a sheet of glass bent to a complex shape;

FIG. 11 is an elevational view, partly in perspective, of a mold used for bending glass sheets depicted in FIG. 10 in the open position preparatory to receive a glass sheet for bending;

FIG. 12 is a view similar to FIG. 11 showing the mold in its closed position forming a continuous frame whose upper shaping surface conforms in outline and elevation to the contour desired for the margin of the bent glass sheet;

FIG. 13 is a plan view partially in perspective of the mold as seen in FIG. 12;

FIG. 14 is a plan view of a flat glass sheet precut to still another outline desired preparatory to bending;

FIG. 15 is a perspective view of one embodiment of mold for bending the glass sheet of FIG. 14 to a compound curvature in the closed mold position;

FIG. 17 is an elevation of still another embodiment of bending mold for bending the glass sheet of FIG. 14 in the closed position;

FIG. 18 is a perspective view of still another embodiment of mold in the open position to receive a flat glass sheet for bending;

FIG. 19 is a perspective view of the mold of FIG. 18 in the closed mold position;

Figure 21:
Figure 23:
Figure 25:
Figure 20:
Figure 22:
Figure 24:

FIGS. 20 to 25 illustrate schematicaly the progress of a compound bend conducted on the embodiments depicted in FIGS. 17 to 19. FIGS. 20 and 21 show how the flat glass is supported on the mold preparatory to bending, FIG. 20 being a schematic longitudinal elevation and FIG. 21 an end view thereof; FIGS. 22 and 23 are schematic longitudinal and end views similar to FIGS. 20 and 21, showing the glass and mold during an intermediate phase of the compound bending cycle; and FIGS. 24 and 25 are views similar to those of FIGS. 22 and 23, respectively, showing how the bent glass sheet is supported on a mold after both the longitudinal and transverse bends are completed;

FIG. 26 is a longitudinal, schematic view of a lehr suitable for use in performing the present invention;

FIG. 27 is a schematic sectional view along the lines XXVII—XXVII of FIG. 26; and FIG. 28 is an enlarged, fragmentary longitudinal section along lines XXVIII—XXVIII of FIG. 27.

Figure 1:
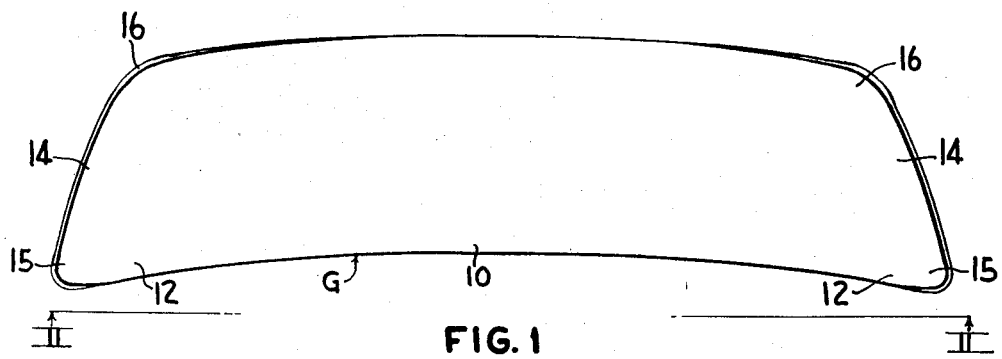
Figure 2:
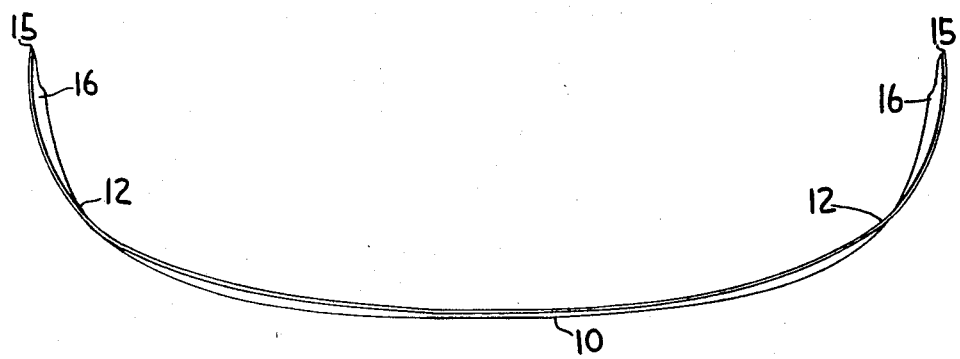
FIG. 2 is a view at right angles to FIG. 1 along the lines II—II thereof.

Referring to the drawings, FIGS. 1 and 2 depict a glass sheet G having a central portion 10 of relatively shallow curvature, merging into areas 12 where the radius diminishes rapidly and end sections 14 having one surface 15 relatively flat and another portion 16 relatively curved. Such a sheet of glass is required to be bent cylindrically in its central portion 10 along a fairly shallow curvature merging into cylindrical bends at the portions 12 of the increasingly sharper curvature. The end portions 14 are bent to complex bends comprising both longitudinal and transverse curvatures and are twisted with respect to the center portion.

Figure 3:
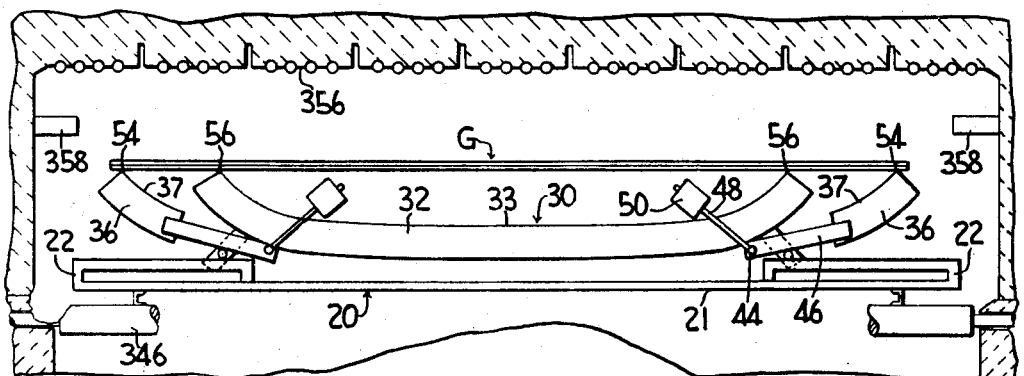
FIG. 3 is a schematic side elevational view of a typical mold shown in the open position supporting a sheet of flat glass for bending to the shape depicted in FIGS. 1 and 2.
Figure 4:
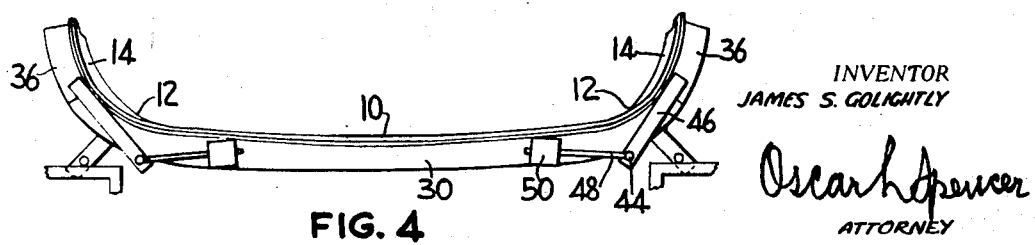
FIG. 4 is a partial side elevational view of the mold of FIG. 3 showing the latter in closed position containing a bent sheet of glass.
Figure 5:
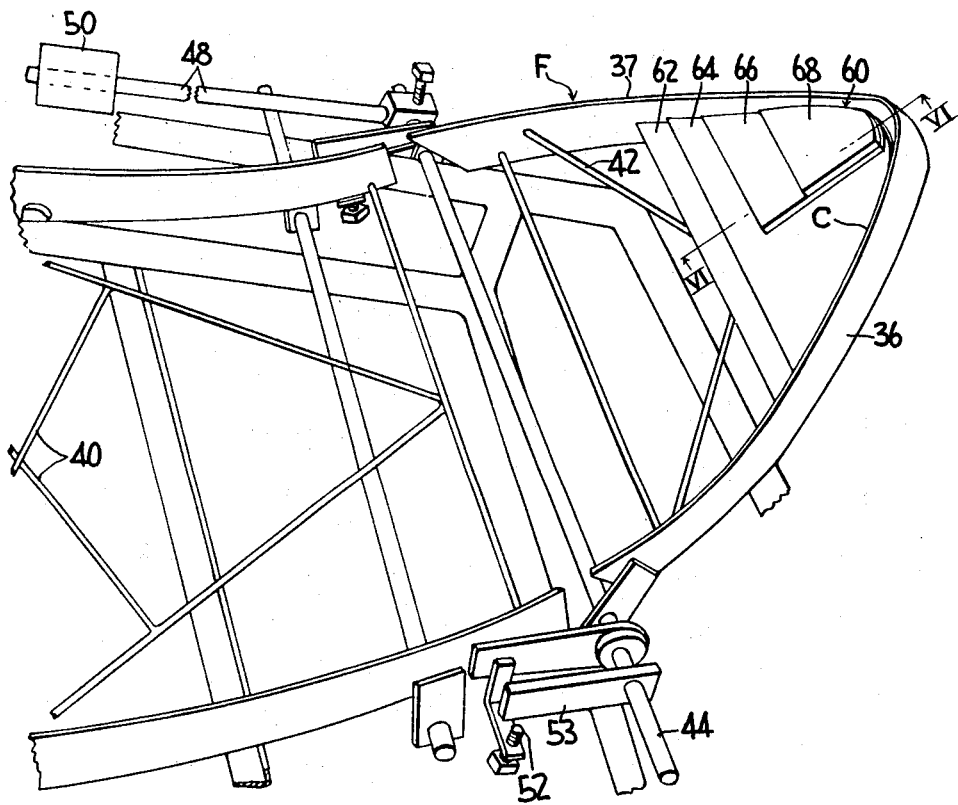
FIG. 5 is an isometric view of a portion of the mold depicted in FIGS. 3 and 4 showing the details of an embodiment of the present invention.

Referring to FIGS. 3, 4, and 5, reference number 20 depicts a mold carrying frame provided with a pair of spaced longitudinal side members 21 of L-shaped configuration and a pair of cross members 22 connecting the ends of the side members. The cross members also may be L-shaped in configuration for additional rigidity. A mold 30 comprising a main central portion 32 and spaced wing portions 36 is supported at its central portion 32 by fixed attachment to the mold supporting frame 20.

The upper surface 33 of the main central portion 32 and the upper surface of the wing portions 36 are shaped to the contour desired for the corresponding portions of the bent glass sheet. Transversely extending braces 40 interconnect the opposing sides of center section 32, while similar braces 42 interconnect the opposing longitudinal sides of the wing members 36 to improve the rigidity of the mold structure. These braces are preferably removed as far as possible from surfaces 33 and 37 in order to minimize localized heat variations to which adjacent portions of the glass sheet are subjected. In addition, the mold sections 32 and 36 for bending glass to be tempered subsequently may be serrated at the surfaces 33 and 37, respectively, to provide passages for the escape of air blown against the glass during the tempering operations.

Wing members 36 are pivoted about pivots 44. Extensions 46 may be attached to each wing member 36 in order to provide a pivotal connection, or the pivots may be attached directly to the wing members, depending on the curved shape required for the glass. A lever arm 48 provided with a weight 50 is attached to the wing member 36 in such a manner that the weight 50 counterbalances the weight of its wing member 36 about the pivot 44.

When the mold is not subjected to a load, such as a flat glass sheet, the mold tends to be in a closed position whereby the wing members 36 are rotated into the position depicted in FIG. 4. In this position surfaces 33 and 37 form a continuous skeleton conforming to the shape desired for a glass sheet to be bent on the mold.

The wing members 36 are rotatable to an open position such as shown in FIG. 3 to receive a flat sheet of glass. At this open position, the length of the mold is slightly less than that of the flat sheet of glass to be bent, this difference in length preferably not exceeding ½ inch. In the open mold position, the flat glass is supported at the outboard extremities 54 of each wing member 36 and also, preferably, at the outboard extremities 56 of the fixed center section 32. Such molds are referred to as center supporting molds in this description.

In operation, one or more flat sheets of glass G are mounted on the open mold. The glass and the mold are then conveyed into a bending lehr where the glass and the mold are gradually heated to prevent thermal shock. The glass, which was rigid while cold, softens upon the application of heat. The center portion 10 of the glass conforms to the center portion 32 of the mold, and the area of contact between the softening glass and the center portion of the mold increases. The weighted lever arms 48 then force the extremities 14 of the heat-softened glass G to curl upwardly to conform to surfaces 37 of the mold. A stop member 53 limits the closing movement of the mold by rotating with the wing member 36 until it contacts set screw 52.

In bending glass sheets where the opposite sides of the longitudinal extremities of the glass are bent to different curvatures, it has been found necessary to impart different degrees of heat to different localized portions of the glass. The center supporting skeleton molds previously utilized are so built that a substantially uniform heat blanket is imparted to the different portions of the glass sheets. Since continuous bending of glass is accomplished by conveying the glass sheets sideways through a bending lehr where heat is applied to flat glass sheets supported on the open mold, it is possible to vary the degree of heat applied to the glass passing through the lehr along the longitudinal but not the transverse axis of the glass by supplying localized heat of different intensity at different locations transversely of the bending lehr. The particular mold shown in FIG. 5 is designed to maintain the shape of the side of the glass adjacent portion F of the mold wing 36 flat and to curve the side adjacent portion C.

According to one embodiment of the present invention, this particular transverse shaping at the longitudinal extremities of the glass is accomplished by attaching a web 60 to the skeleton structure of wing section 36. The web 60 may comprise a stack of metal plates 62, 64, 66, and 68 of different cross-sectional areas underlying a portion of the glass where localized differential curvatures are desired. Webs 60 behave as heat sinks to absorb a certain proportion of the heat that otherwise would be absorbed by the adjacent portion of the glass sheet to be bent. In regions where the web is relatively thick, such as in the area covered by all four web plates, a large percentage of heat is preferentially absorbed by the plates rather than the glass. In the thinner portions of the web, a greater portion of the heat imparted by the heat elements in the bending lehr is absorbed by the glass. Therefore, the glass bends more readily in those regions where there is less preferential heat absorption by the webs than where the webs remove a greater portion of the heat available for softening the glass. Therefore, the provision of these webs 60 enables local portions of glass to be bent to different degrees of curvature.

Figure 6:
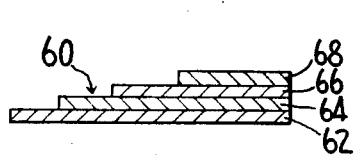
FIG. 6 is a cross-sectional view of an element forming part of the present invention seen along the lines VI—VI of FIG. 5.
Figure 7:
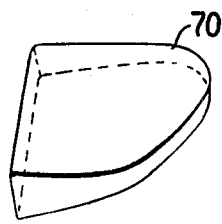
FIG. 7 is an isometric view of an alternate embodiment of an element such as shown in FIG. 6.

Details of two embodiments of a web are shown in FIGS. 6 and 7. In FIG. 6, the web 60 consists of a series of plates having different cross-sectional areas fixed together to provide different thicknesses in different areas, thus varying the heat absorbing capacity in different areas of the web. While FIG. 5 shows a web 60 extending completely across the outboard extremity of wing section 36, it is understood that the plates may extend only partly across, thereby only partly closing the skeleton framework in that region. Also, in lieu of the plurality of superimposed plates, the web may be shaped in the form of a wedge 70 where the thickness gradually tapers or has any configuration necessary to insure the proper selective absorption of heat emanating from overhead heaters in a glass bending lehr. Such a unitary structure is shown in FIG. 7.

The above apparatus is especially suitable for producing bends wherein the opposite sides of the longitudinal extremities of the glass sheets undergoing shaping are bent to different curvatures employing a technique in which the glass sheets are conveyed transversely through a tunnel-like lehr and different longitudinally extending areas are simultaneously heated to different temperatures by abstracting less heat along one lateral side than is abstracted along the other lateral side of the sheet undergoing heat-softening. The thicker portion of each heat absorber member employed has a greater heat capacity than the thinner portion thereof. Hence, the thicker portion is disposed adjacent the side area to be maintained relatively flat where it is capable of abstracting more heat from the adjacent portion of the glass sheet. At the same time, the thinner portion is disposed adjacent a longitudinal area adjacent thereto where some control of sagging is desired.

While the terms "webbing" and "webs" have been utilized extensively to describe the heat absorbing members 60, it is understood that these terms are not limited to a plate or a sheet or a network of delicate threads, but are intended to include any member having a relatively large thermal capacity compared to that of an equivalent area of glass. Such a heat absorbing member has heat absorbing properties that are capable of abstracting heat from a portion of a sheet of glass being bent in a region where a differential application of heat is required to avoid overbending the glass in this region.

While the particular embodiments described above disclose the use of heat abstractor members at the longitudinal exteremities of molds designed to bend glass sheets to longitudinal bends having relatively flat extremities or extremities twisted relative to the remainder of the sheet, it is understood that the principles of the present invention can be equally utilized in inhibiting the bending of other regions of the glass sheet, for example, the central region. For example, if a transverse bend is desired in the region between the sharply bent portions of a non-uniform longitudinal curve, one or more heat abstractor members may be employed to underlie one or more portions of the central region of the mold underlying the central portion of the glass desired to be maintained relatively flat. The unshielded portion of the central section of the glass sheet tends to soften and bend transversely, whereas the portions of the sheet overlying the centrally disposed heat absorber members remain relatively rigid compared to the portion of the central region of the glass sheet from which heat is not abstracted. In this manner, the severity and location of the transverse sag can be closely controlled just as any other region of the glass sheet by localized use of heat abstractors according to the present invention.

Figure 8:
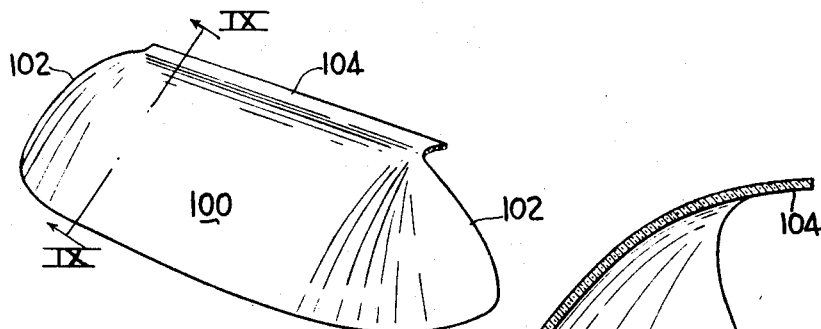
FIG. 8 is a perspective view of a sheet of glass bent to a compound bending pattern different from that depicted in FIG. 1.
Figure 9:
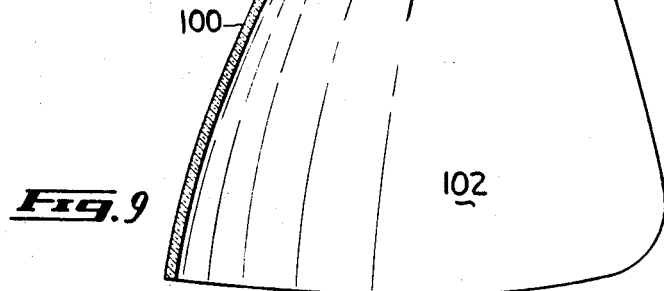
FIG. 9 is a sectional view along the lines IX—IX of FIG. 8.
Figure 10:
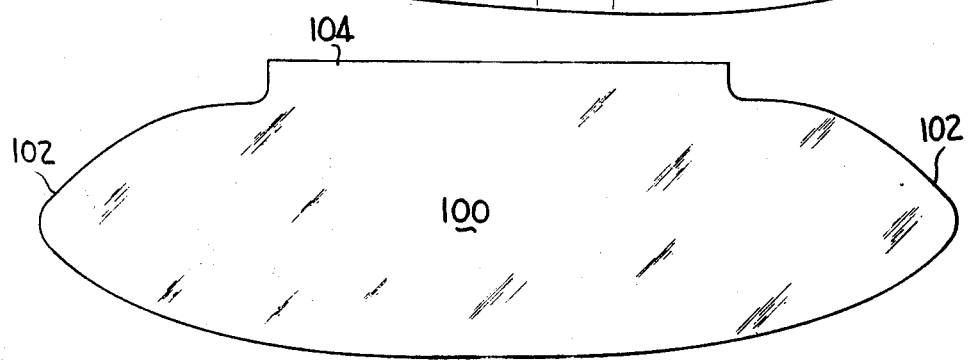
FIG. 10 is a plan view of a flat glass sheet preparatory to bending it to the shape depicted in FIGS. 8 and 9.

Another bent glass sheet structure which forms part of the ultimate windshield is shown in FIGS. 8, 9, and 10. According to these drawings, the glass sheet comprises a center portion 100 terminating in tips 102 which are bent sharply relative to the central portion 100 to extend rearwardly at the sides of the automobile and side extension 104 which is curved transversely to extend into the vehicle roof.

The mold for producing this embodiment is shown in FIGS. 11 to 13 and comprises a carriage frame 120 which includes longitudinally extending angle irons 122 interconnected by transverse angle irons 126. Support rods 130 are provided to support the mold structure in spaced relation above its supporting carriage. An intermediate beam 133 interconnects the transverse angle irons 126.

The mold includes a center mold section 139 comprising a smoothly curved center section rail 140 and a reversely curved center section rail 142, and end mold sections 143 and 144 comprising end section rails 145 and 146 pivoted relative to the central mold section 139 such as in the first embodiment.

Stub hingers 148 are attached to the center section rails 140 and 142. Formed metal straps 149, which are pivoted about stub hinges 148, interconnect lever arms 150 and 151 to the opposite side extremities of the end mold sections 143 and 144. Each lever arm 150 and 151 is counterweighted at 152 to provide a bending moment tending to close the mold.

Each mold section is reinforced with a reinforcing flange 160 at its bottom extremity forming a rail of inverted T cross-section.

Each of the metal straps 149 for lever arm 150 is provided with an extension 155 which is designed to make contact with a stop member 162 similar to one of the stop members 52 of the previous embodiment.

The central mold section is provided with a heat abstrator 164 comprising one or more metal plates 166 attached by means of support rods 167 to a longitudinally extending angle iron 122 or the intermediate beam 133 and includes an upper screen 168 having a peripheral portion overlapping the periphery of the metal plates for purposes of providing a graduation in the pattern of heat selectively abstracted from the overlying glass sheet, thus minimizing thermal shock between adjacent areas of the sheet subjected to selective heat abstration and free from heat abstraction.

At the outboard extremities of the mold section, additional heat abstractor plates 180 and 182 are provided. These latter plates are supported from the transverse angle irons 126 by means of a supporting structure shown generally as 186 including braces and support rods.

This embodiment requires that the transverse bend be localized and spaced a considerable distance inboard of the reversely curved portion delineated by center mold section rail 142. Therefore, the rail 142 is provided with a slide bar 170 that is spaced therefrom and completely embraces the latter and extends obliquely upwardly outwardly of the portion of the outline defined by the rail. The end mold sections 145 and 146 are provided with slide bars 172 and 174, respectively, which are spaced therefrom to embrace the latter and extend slightly beyond the mold extremities 176 and 178, respectively.

A guide 190 which comprises a bent rod 192 attached at its fixed end to a longitudinally extending angle iron 122 and including a ceramic sleeve extending upwardly from the free upturned portion 194 of the rod terminates in the plane of ultimate curvature desired for the transverse sag in the region of maximum sag. Thus, operators attending a bending lehr are able to observe when the transverse bend has been completed and are thus able to adjust the controls in the lehr accordingly in order to insure optimum bends.

Referring to the drawings, FIG. 14 shows a typical precut glass sheet 200 having a main central portion 215 of modified elliptical shape, merging at its longitudinal extremities into wing portions 216 and 217 adapted to be "wrapped around" the sides of a vehicle, and an auxiliary portion 218 having a reversely curved side extending longitudinally at one side of the sheet. The latter portion is bent transversely of the main central portion 215 to extend into the roof of the vehicle. This sheet includes a smoothly curved side 219 opposite auxiliary portion 218. Side 219 forms the bottom of the bent panel as the latter is mounted in a vehicle.

Referring particularly to FIG. 15, which shows another typical glass bending mold for performing the present invention, the device comprises a support structure including a longitudinally extending rail 225 and cross rails 226 fabricated of elongated angle irons. A longitudinally extending brace rod 227 connects the cross rails 226 to improve the rigidity of the support structure. Vertical posts 228 extend upwardly in pairs from each laterally extending beam 226. The upper ends of the front vertical posts are connected to a reversely curved front side rail 230. The other two vertical posts 228 are connected at their upper ends to a smoothly curved rear side rail 232.

The latter extends longitudinally of the mold between its longitudinal extremities 233 to form an arcuate structure adapted to support the central portion of one margin of a glass sheet after bending. Side rail 230 is curved near its longitudinal extremities into a convexly curved portion 234 merging into a substantially straight portion 236 and then into a concavely curved portion 238 near each longitudinal extremity 239.

Outboard molding members 240, having front inboard extremities 241 and rear inboard extremities 242 are provided at the outboard extremities of the mold. In the closed mold position shown in FIG. 2, they extend in generally C-shaped configuration from adjacent longitudinal extremity 239 of rail 230 to adjacent laterally opposing longitudinal extremity 233 of rail 232. A counterweighted arm 243 provided with a counterweight 244 at its inboard extremity extends beyond the rear inboard extremity of each outboard molding member to which it is fixed. The counterweighted lever arm is provided with an ear 246 forming a hinge connection with a hinge rod 248.

At the front end of the mold, the inboard extremity of each outboard molding member is connected to a counterweighted lever arm 256 provided with counterweights 252 by means of an angular strap 254. The latter is provided with a dog apertured to receive the opposite end of the hinge rod 248 with which it makes bearing contact. Thus, the outboard molding members 240 are rotatable to a spread mold position relative to the rails 230 and 232, which are fixed to the support structure. The weights 244 and 252 cause the outboard molding members 240 to rotate about the hinge rods 248 into a closed mold position wherein rails 230 and 232 and outboard molding members 240 provide a substantially continuous frame conforming in both elevation and outline to the shape desired for the bent glass sheet.

Each of the vertical posts 228 contains an apertured lug 260 provided with an adjustable set screw 262. The vertical position of set screw 262 controls the amount that the outboard molding members 240 rotate relative to the fixed rails 230 and 232. When the counterweighted arms 250 and 243 rotate sufficiently, they contact the upper surfaces of the set screws, thereby preventing further rotation of the outboard molding members.

An angular support column 270, insulated from the mold structure at 271, is attached to an upright extending from each longitudinal extremity of the rail 225. Each column includes a pivot hinge 272 at its upper extremity. A counterweighted arm 274 is mounted for rotation about the hinge 272. Arm 274 also carries a pin 275, which extends outwardly therefrom to abut column 270 and limit its rotation. An electrode 276 having a tapered end portion 278 is fixed to the end of the hinge rod 272 opposite that containing a counterweight 279.

A loose, heavy, flexible wire 280 of a suitable metal having the requisite properties of conductivity, flexibility and freedom from oxidation at the lehr temperatures connects each electrode 276 to a connector 281. The heavy wires are electrically coupled to the extremities of heater coil 282 at the connector 281. Ceramic brackets 284 hold coil 282 onto an open support structure 286.

Heater coil 282 is preferably of open coiled wire to enable heat radiated by overhead lehr heaters to pass through to the glass sheets undergoing bending. If the heater coil is held in a solid support rather than an open support, the critical strip of the glass beneath the coils 282 is shielded from the overhead lehr heaters, and the critical strip is prevented from being heated to the temperatures enabling facile softening by radiation from the energized coils.

Support structure 286 includes a pair of vertical sleeves 288 fixed to the longitudinally extending beam 225, and a rod 290 slidable axially within each sleeve. Set screws are included to fix the vertical position of the rods 290 within sleeves 288. Additional sleeves 294 are jointed to rods 290 at elbow joints 296. Rods 298 are adjusted axially relative to sleeves 294 and fixed in position by means of set screws 300. A rod 302 interconnects the sleeves 294. Branches 304 are connected to rod 302 to provide means for supporting the ceramic brackets 284.

Rails 230 and 232 are interconnected by an intermediate recessed cross beam 310 and diagonal braces 312. Cross beam 310 supports a vertical rod 314 upon which is mounted a sleeve 316 of flexible ceramic material which extends upwardly about ½ inch above the topmost edge of the vertical rod 314 and terminates at the location to which the glass is desired to sag in its bent configuration.

The mold may also be provided with heat abstractor plates 320 supported beneath adjacent the mold extremities on vertical posts 322 attached to support braces 324 connecting the bottom portions of the vertical posts 322 to the laterally extending beams 226. These heat abstractor plates absorb some of the heat reradiated from the ends of the glass and by virtue of their selective abstraction of heat from the glass extremities prevent undue curling of the glass in those regions outboard of the regions of severe longitudinal glass bending.

The particular mold structure recited above is especially adapted for use in a bending lehr 340 (FIGS. 26 to 28) provided with bus bars 358. Conveyor rolls 346 comprise a conveyor which carries molds M transversely through a lehr from its entrance 342 to its exit 344. The conveyor extends successively through a preheat chamber 348, a longitudinal bending chamber 350, a transverse bending chamber 352, and an annealing chamber 354. Electrical heating elements 356 are carried by the lehr roof. Voltage regulators are included in the power supply circuit (not shown) of each electrical element for varying the intensity of its power input. Laterally opposing bus bars 358 are carried by opposite walls of the transverse bending chamber.

The lehr also includes a number of windows 360 through which personnel can observe the bending operation. Operators can adjust the power input and the location of each individual set of electrical heating elements 356 relative to the passing molds in response to their observation of the pattern of bending resulting from the lehr operation. Observation is enhanced by utilizing the flexible ceramic sleeve 316 as a guide for indicating the amount of downward displacement of the center of the sheet during the bending cycle.

The operation of the mold just described is as follows. Outboard molding members 240 are rotated into a spread position separated from the longitudinally extending rails 230 and 232. Coil support bracket 286 is moved to a vertical position clear of the mold. For this purpose, elbow joints 296 are rotatable into a locked position for supporting the bracket 286 vertically in the position shown in FIG. 3. Precut flat glass sheets are mounted on the opened mold and supported on the outboard extremities 239 and 233 of rails 230 and 232, respectively, and of outboard molding members 240. The bracket 286 is rotated to its horizontal position. Stops on elbow joints 296 prevent the bracket from rotating beyond its horizontal position.

The glass-laden mold is then placed at the entrance 342 of the glass bending lehr. This is accomplished by mounting the transverse support means 226 upon conveyor rolls 346 which are rotated thereby forcing the mold laterally through the preheat chamber and the longitudinal bending chamber to transverse bending chamber. The electrical heaters 356 located above the path of movement of the molds can adjust the local intensity of the heat pattern imparted to each longitudinal increment of glass passing thereunder by adjusting its location relative to the moving glass and the amount of electrical power supplied to each heater. Thus, the glass and the mold are first soaked with heat to a uniform temperature in preheat chamber and then preselected portions transversely of the lehr (longitudinally of the glass) are subjected to more intense heat than the other portions of the glass in the longitudinal bending chamber. The glass sheet softens under the influence of the heat. The counterweights 244 and 252 urge the outboard molding members 240 to rotate, thus lifting the extremities of the glass relative to the central portion. The central portion sags to conform to the shaping surfaces defined at the upper surfaces of mold rails 230 and 232.

The molds are conveyed through the lehr at a speed chosen for best combination with the heating pattern in the various chambers so that when the longitudinal glass bend has been substantially completed, the molds move to a position within the lehr where the beveled leading portion 278 of the trolley electrodes 276 engage bus bars 358. Counterweights 279 urge the top surface of the trolley electrodes 276 into intimate sliding electrical contact with the bottom surface of bus bars 358. As the mold passes the region of the lehr containing the bus bars, the potential difference between the bus bars heats the coils 282, which radiate heat onto a thin, longitudinally extending, critical strip defining the axis of most severe transverse curvature. After the mold passes through the lehr chamber containing the bus bars, the electrical heating element 282 is de-energized by disengagement of trolley electrodes 276 with bus bars 358.

Mounting the trolley electrodes 276 on counterweighted arms 274 improves the electrical contact between the electrodes and bus bars 358, because contact is made at the bottom surface of the bus bars where there is little chance for the deposit of dust and other particles inhibiting intimate electrical contact. The upper surface of trolley electrodes may be wiped between passes the mold makes through the lehr, if necessary to remove dust particles. Cleaning the upper surfaces of the bus bars is a major operation that may impair the continuous operation of the bending lehr.

Figure 16:
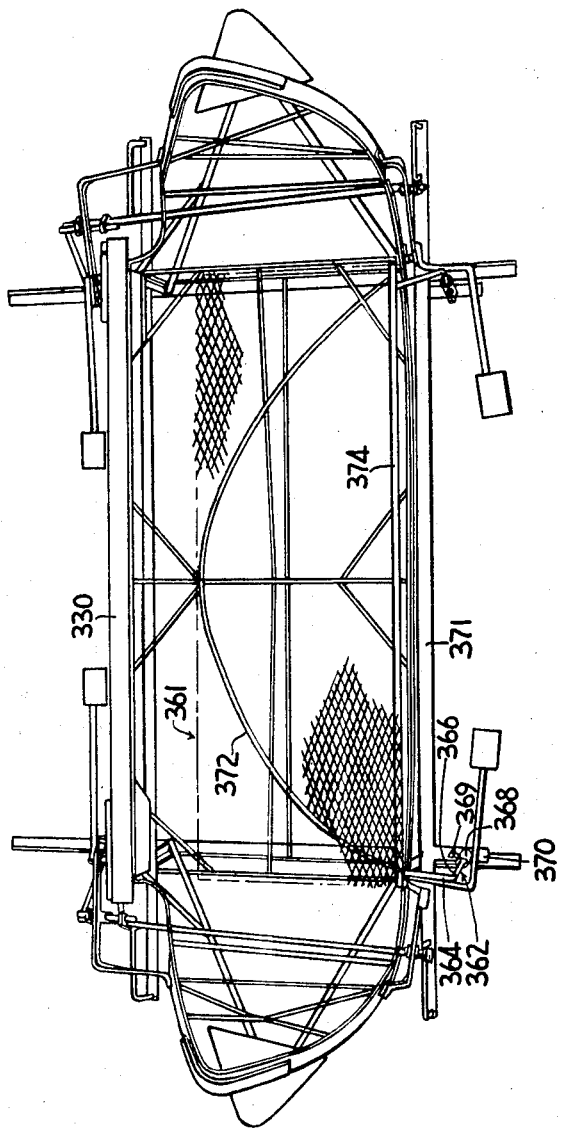
FIG. 16 is an alternative embodiment of a bending mold for bending the glass sheet of FIG. 14, shown in the closed position.

Referring to FIG. 16, another embodiment of a glass bending mold is shown. However, this structure is limited in its use for bending glass to compound curvatures including a relatively gentle transverse curvature of non-uniform severity. In such apparatus, the smoothly surfaced sheet of the heat reflective material 330 reflects sufficient heat radiated by the lehr heaters 356 into the local critical region to be bent transversely without requiring use of the electrical heating elements 282 and trolley connectors 276 with lehr bus bars 358. For such apparatus, the total heat received by the critical region directly from the lehr electrical heating elements 356 and by reflection from sheet 330 is sufficient to soften the critical strip of glass more rapidly than the other strips of the sheet parallel to the critical strip to produce the desired transverse bend.

The apparatus of FIGS. 15 or 16 may be modified additionally by providing an open mesh wire screen 361 mounted in cantilever fashion to the support structure. Angle bars 362, each having a horizontal portion 364 and a vertical portion 366, support the screen. The vertical portions are locked by lock nuts 369 within a pipe 368 carried by a support lug 370 fixed to a rail 371 of the mold support structure. The screen 361 is reinforced by an arcuate reinforcement 372 whose ends are interconnected by a beam 374. Horizontal portions 364 are secured to beam 374 by welding to support the latter.

In such a structure, the flat glass is first mounted on the mold and then the open mesh screen structure is attached to the mold structure by inserting vertical portions 366 into the pipes 368 and securing them by tightening the lock nuts 369. The provision of the screen inhibits undue bending of the portion of the glass which is to be maintained flat relative to the other regions of the compoundly bent sheets.

The screen 361 may be disposed below the mold shaping surface as well as above said shaping surface in the manner of the heat absorber of the embodiment of FIGS. 11 to 13.

For extremely complex bends, it may be necessary to replace the reversely curved molding member 230 with a rotatable member 380 mounted on hinges 382 for rotation on an axis extending longitudinally of the mold relative to the smoothly curved side rail 232, and provided with means urging member 380 to rotate into a position forcing a transverse bend. Such a structure is depicted in FIGS. 17 to 19.

Rotatable side rail 380 includes an eye 384 engageable by a hook 386 of a pivotable latch 388 mounted for rotation about a pivot rod 390 held by a twin plate member 392 secured to rail 225 of the support structure for the mold. A rail 394 supports a pair of posts 400 each supporting a stub bearing rod 402 at its upper end. Lever arms 404 are counterweighted at one end at 406 and make swivel connection to a hinge 408 at the end opposite the end carrying the counterweight. The end of the hinge is connected in pivotable relation to the rotatable rail 380 by means of a pivotable housing 410. Each post 400 contains an apertured lug 412 through which a set screw 414 is secured in screw-threaded relationship.

Rotatable rail 380 is maintained in its outermost position by engagement of hook 386 with eye 384 until a desired phase of the bending cycle. At this point, the latch 388 is pivoted, thus disengaging hook 386 from arm 384 and permitting the counterweights 406 to rotate lever arms 404 to raise hinges 408, bearing brackets 410 and rotatable side rail 380 an amount limited by engagement of lever arms 404 with set screws 414. This action is coordinated with bus bars 358 in the transverse bending section of the lehr.

Referring to FIGS. 18 and 19, various views of a particular embodiment of our invention are shown. This typical apparatus includes a pair of spaced L-beams 420 extending transversely of the mold, interconnected by a longitudinally extending L-beam 421 and struts 422 interconnecting beams 420 with a support bracket 423 to form a supporting frame for the bending mold. Vertically extending angle irons 424 interconnect cross-beams 420 with a fixed side rail 426 having an upper surface conforming to a portion of the margin desired for a bent glass sheet. Cross bars 428, which are fixed to the supporting frame to form part of its superstructure, extend transversely from adjacent the longitudinal extremities of the fixed side rail 426 to improve the structural rigidity of the mold. Opposing fixed side rail 426 and spaced laterally therefrom is a rotatable rail member 427 provided with opposite longitudinal extremities 429 that are bent laterally of the mold relative to its main portion.

A rod 430 is fixed to the mold support frame at each end thereof by virtue of its connection to a rod 453 rigidly secured to an upright 431 fixed to longitudinally extending L-beam 421. A counterweighted lever arm 432 has a bifurcated extension 433 pivotally attached about rod 430. A floating link 434 is pivoted at one end to the end of the bifurcated extension 433 and at its other end to an additional link 435. The latter, in turn, is pivoted at its other end to a bearing rod 438 rigidly connected to the mold support frame through a support post 439. A T-bar 436 has its stem pivoted to the pivotal connection between floating link 434 and additional link 435, while its cross member rigidly interconnects additional link 435 to each longitudinal extremity 429 of the rotatable rail 427. Adjacent the longitudinal extremities 429 of the rotatable rail 427, small fixed rails 437 are located. Each rail 437 is rigidly connected through a bearing rod 438 and support post 439 to the mold support structure. Rails 426, 427, and 437 provide the center section of the bending mold. Rails 426 and 437 are all fixedly attached to the supporting frame whereas rail 427 is hingedly connected thereto by virtue of the connection between the T-bar 436 and additional link 435 about bearing rod 438. The bearing rods 438 thus provide pivot means defining a longitudinal axis extending substantially parallel to rail member 426. Rail 427 is pivotable relative to this pivot means.

At each outboard extremity of the bending mold are provided wing sections 440. These wing sections are substantially C-shaped in contour and contain upper shaping surfaces 442 shaped to the contour desired for the opposing longitudinal extremities of the glass sheet.

At the front side of the bending mold containing the rotatable rail 427, the inboard extremity of each outboard molding section is provided with an angle bar comprising a lateral portion 444 bent into a longitudinal portion 445 extending longitudinally inboard of the bending mold. The longitudinal portion ends in an S-shaped lever arm 446 containing a counterweight 448 at its inboard extremity. The angle bar is braced by means of a bracing rod 449.

A lug 450 extends downwardly from the portion 445. The bottom of the lug 450 is apertured to receive a bearing rod 452, fixed to the upright 431 of the supporting frame to provide a bearing for rotation of the lug 450 about the bearing rod. Upright 431 is also connected to a thin transverse connector rod 453. A cam 454 is attached to lug 450 by a stud 455.

At the rear side of the mold containing the fixed center section rail 426, arms 456 extend longitudinally inboard from their places of attachment to the outboard mold sections 440. Apertured lugs 457 extend upwardly from the opposite end of the transverse connector rod 453 held by lug 431. Counterweights 458 may be attached to the inboard extremities of arms 456.

Counterweighted arm 56 is rotatable about stub bearing 459 carried by lug 457. The stub bearing is aligned with hinge rod 452 to provide an axis of rotation for each outboard mold member 440 and its attached cam 454 relative to the center molding section fixed to the mold. The counterweights 448 and 458 urge the outboard mold members into a closed mold position. A stop bar 461 prevents the outboard members 440 from rotating beyond their desired rotation by abutment by stud 455.

In order to enhance the selective heating of the different portions of the glass sheet mounted for bending the glass to extremely severe transverse curvatures, a longitudinally extending sheet of heat reflective material 460 may be provided as part of the superstructure of the supporting frame to underlie the glass in the region intermediate and spaced from shaping rails 426 and 427. Sheet 460 may be attached to a recessed central cross-rod 462 and to some of the reinforcement braces which form part of the mold supporting frame, as well as cross bars 428. Also, additional plates 470 of heat reflective material may be secured to the rotatable rail 427 to enhance the heat applied to the region of the glass sheet to be bent transversely. These sheets may have their upper surfaces slightly concavely shaped transversely of the mold to enhance the desired effect.

Heat abstractor plates 480 are optionally secured to the supporting frame for the fixed center rail 426 by means of vertical posts 482 and rods 484, 486, and 488 which interconnect the bottom of posts 482 with either cross-beams 420 or vertically extending angle irons 424. The heat abstractor plates 480 underlie the outboard sections of the mold when the latter are rotated into an open mold position. Their purposes is to abstract heat reradiated by the longitudinal extremities of glass sheets mounted for bending on the mold, thus preventing undue curling of the glass at its longitudinal extremities.

In order to receive flat glass sheets preparatory to mounting, it is necessary that the outboard mold sections 440 be rotated into their outward positions. Counterweighted lever arms 432 are provided with a roller 490 and a counterweight 492. Thus, by lifting the counterweights 492, floating links 434 and crank arms 435 move the angled connector rods 436 in such a manner that rail member 427 is rotated into a lowered position. Rotation of the outboard members 440 to a spread position beneath the lifted rollers 490 mounted on the counterweighted lever arm 432. Thus, the mold may be opened and locked transversely. The cams 454 and the counterweighted lever arms 432 thus constitute cooperating cam members that behave as inhibiting means to prevent rotation of rail member 427 from its lowered position for supporting the flat glass sheet to its upper position to support the bent glass sheet.

One or more flat glass sheets precut to the outline desired for the finally bent sheet are laid on the open mold and are supported at their longitudinal extremities 216 and 217 by the outboard extremity of the outboard sections 440, and their side extremity 219 by the longitudinal extremities of the upper shaping surface of rail 426, and at their side extremity 218 by the downwardly rotated rail 427 and the small fixed rails 437. The glass laden mold is then conveyed into a bending lehr, where the glass and the mold are soaked with heat to bring them to glass softening temperatures. The rotational moments provided by the counterweights 448 and 458 lift the outboard wing sections 440 whenever the glass is softened sufficiently so that its resistance to this rotational action is decreased because of the decreasing viscosity of the glass as its temperature rises.

As the wing members rotate from the open to the closed position, cams 454 move toward the center of the mold. At the moment the longitudinal bend is substantially completed cams 454 rotated out of or disconnected from supporting engagement with rollers 490. When the latter are no longer supported by cams 454, counterweighted lever arms 432 operate through their linkages 434, 435 to lift rotatable rail 427, thus raising the rail-supported, heat-softened side extremity 218 of the glass. Lever arms 432 may be interconnected, for example, by a connector bar 432′ depicted in phantom in FIG. 2, so that both cams must be removed from contact with rollers 490 before counterweights 492 can bear their movements of force on the glass. This eliminates any warpage of rail member 427 because of the imposition of unequal forces by the counterweights at different positions thereof, and any lack of constancy in the transverse bend that would result from one end of the softened portion 418 being subjected to mechanical lifting before the other.

As stated previously, overbending of the wing members 440 relative to the fixed rails 426 and 436 is prevented by the engagement of stud 455 with stop member 461, and the simultaneous engagement of arm 456 with set screw 463. Similarly, excessive rotation of the rotatable rail member 427 is prevented by means of a stop member 496 comprising an apertured lug 498 through which is screw-threaded a set screw 500. Stop member 496 is supported by post 439, which also supports pivot rod 438.

When rotatable rail section 427 has been rotated the desired amount, the additional link 435 contacts the bottom surface of set screw 500, thus preventing further rotation.

Another feature of this apparatus that may be included is a sag indicating means exemplified by a vertical finger 504 (FIG. 19) which extends upwardly from the depressed center cross rod 462 within the outline of the mold to a height designed to touch the glass when the latter sags. Finger 504 comprises a metal rod 506 fixed securely at its bottom to cross rod 462 and a sleeve 508 of flexible refractory material such as a fiber glass product fixed to the rod and having its upper half inch extending beyond the rod to the elevation conforming to that desired for the sagged central portion of the glass sheet. The flexible refractory material is positioned intermediate rails 426 and 427 and below their shaping surfaces to face the undersurface of a supported glass sheet and is capable of deflecting when contacted by a sagged portion of the glass sheet, thereby indicating the amount of sag developed in the glass sheet.

Best results are obtained for extremely severe compound curvatures when the longitudinal bend is completed before the mechanical force is applied to aid the transverse bend, since glass is difficult to stretch in two directions simultaneously. However, if the glass is maintained at its elevated temperature beyond the time required for the bending to be accomplished, an unwanted sag is imparted to the glass. The provision of the fingers 504 enables operators to view the progress of the longitudinal bend through windows disposed along the side walls of the bending lehr.

The position of the undersurface of the glass relative to the fingers indicates the proper time for the transverse bend to commence. Experience determines the optimum position in the lehr for this to take place. Thus, if the finger sleeve 508 is deflected to indicate the glass is sagging too rapidly, the rate of bending may be decreased. Conversely, the bending rate may be increased whenever the sleeve 508 indicates that the bend has not progressed sufficiently. Each handle 510 may comprise a U-shaped pipe or rod fixed at its extremities to an angle iron 512 extending outwardly of the cross beams 420.

In the embodiment described above, the cams 454 are engageable with the rollers 490 of the counterweighted lever arms 432 to provide inhibiting means in operative connection to the pivotable rail 427 through elements 432 to 436, inclusive, to prevent rotation of said pivotable rail 427 about bearing rods 438 by locking rail member 427 in a fixed position, the weights 448 and 458, attached to the wing sections 440 and to the cam 454, to provide tripping means for moving the inhibiting means out of operative connection with the pivotable rail member 427, and the weights 492 operating through weight arms 432, floating links 434, additional links 435 and T-bars 436, serve as actuating or urging means to rotate pivotable rail 427 about the longitudinal axis provided by bearing rods 438 when the inhibiting means is out of operative connection with the pivotable rail 427.

As depicted in FIGS. 20 through 25, the supported glass sheets are first bent substantially longitudinally about their transverse axes and then transversely bent about their longitudinal axes while the glass is supported on the molds illustrated in FIGS. 15, 17, 18, and 19. The transverse bend is promoted by intensifying the heating of a longitudinal area of the sheet spaced inwardly of its side edges by concentrating radiant heat thereon either by the use of heating coils or reflectors or both. In the other embodiments, some transverse bending about an axis extending longitudinally of the treated glass sheet occurs while the glass is being bent longitudinally about an axis extending transversely thereof. This transverse bending is controlled by employing heat absorbers in the vicinity of the critical area undergoing transverse bending or sag about a longitudinal axis so as to enable the heat absorbing members to withdraw heat from the furnace atmosphere adjacent a surface of the glass sheet adjacent the longitudinal area of the sag.

The employment of different thicknesses of heat absorbing material along parallel areas extending parallel to the length of the sheet or the combination of no heat absorbing material facing one longitudinal area portion parallel to some heat absorbing material facing another longitudinal area portion inherently serves the purpose of causing the glass sheet to be bent about its longitudinal axis once the side edges of the glass sheet undergoing bending contact the upper shaping surfaces of the mold and the glass remains subjected to an elevated temperature at which the glass sheet is deformed. Of course, the rate of cross-sagging which occurs under such circumstances is not as rapid as when the glass is subjected to heat radiated from the heating coils or heat is intensified in the critical longitudinal area by reflection.

When a pair of glass sheets are bent simultaneously according to the present invention, they are stacked on the mold and conveyed laterally through the lehr 340 having heaters 356 disposed above the path of mold movement only, as shown in FIGS. 26 to 28. Heating the pair from overhead heaters 356 while abstracting heat from below the pair at localized regions to be maintained relatively flat causes the upper sheet of the pair to soften more readily than the bottom sheet. The upper sheet also serves to filter some thermal radiation from the bottom sheet by virtue of its placement between the overhead primary heat source and the bottom sheet. These factors plus the relative proximity of the upper and lower sheets to the primary overhead heat source enhance intimate contact between the sheets during heat sagging. Gaps between the sheets of the pair are minimized and even avoided entirely during the bending operation.

It is preferable to locate the heat absorber members on the side opposite the glass from the overhead source of heat 356. If the heat absorber members are located between the sources of heat and the glass, thereby shielding the portion of the glass in the "shadow" of the radiant heaters, a line of demarcation between the shielded and unshielded portions is visible in the bent glass, the glass is liable to break due to the thermal shock resulting from the steep temperature gradient between adjacent shielded and unshielded areas of the sheet, and inefficient utilization of the radiant heaters within the bending lehr results. Also, when pairs of glass sheets are shielded from above, the upper sheet remains stiffer than the lower sheet and does not conform as closely to the bottom sheet of the pair as is the case when apparatus conforming to the present invention is employed.

The apparatus shown and described herein represent various embodiments and certain modifications thereof for accomplishing the transverse bending of glass sheets about a longitudinal axis thereof. Each embodiment is provided with a sectionalized, outline shaping rail whose upper surface engages the marginal periphery of the supported glass sheet. The mold support rails permit the molds and their supported glass sheets to move transversely through the tunnel-like lehr or furnace where radiant heat is directed at the sheet to heat the sheet. Heat is concentrated upon a longitudinal area of the sheet spaced inwardly from the longitudinal marginal edges of the sheet, either by virtue of absorbing or withdrawing heat from the atmosphere in the vicinity of the longitudinal marginal edges of the sheet or by imparting additional heat by radiation of the heating coils or heat reflectors onto the longitudinal area. This heat concentration inherently causes the longitudinal area to sag below the upper surface of the shaping rail. The inclusion of heat absorbers in the molds adjacent a surface of the supported glass sheet in an area adjacent the longitudinal sheet area withdraws heat from the furnace atmosphere, thereby controlling the sag.

It is understood that various changes may be made without departing from the spirit of the invention as recited in the claimed subject matter which follows.

What is claimed is:

1. A method of bending glass in sheet form to compound curvatures including a longitudinal bend of non-uniform severity comprising a pair of spaced, localized, severely bent regions extending transversely of the sheet and a transverse bend of non-uniform severity comprising only one severely bent region extending longitudinally of the sheet, said method comprising supporting the sheet along its marginal portion only in bending relation to a shaping surface, exposing the supported glass sheet to glass softening temperatures by conveying the sheet laterally through a hot atmosphere having a non-uniform temperature pattern longitudinally of the sheet including spaced temperature zones maintained at the highest temperature of said pattern through which said regions extending transversely of the sheet are conveyed to accelerate the softening of said transversely extending regions and produce said longitudinal bend and concentrating heat upon said region extending longitudinally of the sheet while heating said sheet to accelerate the softening of said longitudinally extending region and produce said transverse bend, wherein said concentrated heating of said longitudinally extending region comences after said longitudinal bend is substantially completed.

2. In the art of bending a glass sheet into a bent shape having a central portion and end portions bent relative to said central portion by supporting said sheet in bending relation to an outline mold and heating said sheet to a temperature sufficient to sag said sheet into conformity with an outline shaping surface formed along the upper edge of said mold, the improvement comprising absorbing heat from each of at least two areas of said sheet, one of which areas is adjacent a lateral side of said sheet, said areas each being contiguous to one another and extending in the same direction in which said adjacent lateral side of said sheet extends, and selectively absorbing a substantially different amount of heat from each of said areas than is absorbed from an area adjacent thereto, whereby the sheet bends less readily in an area from which a greater amount of heat is absorbed than in an area contiguous thereto from which a lesser amount of heat is absorbed.

3. The improvement as in claim 2 wherein substantially no heat is absorbed from an area of said sheet contiguous to at least one of said areas from which heat is selectively absorbed, whereby the sheet bends more readily in said area from which substantially no heat is absorbed than in an area contiguous thereto from which heat is absorbed.

4. The improvement as in claim 2, wherein said glass sheet is moved transversely through a hot atmosphere having a non-uniform temperature pattern transverse to the direction of glass movement during said heating and heat absorbing steps, whereby said glass sheet is bent to a compound shape comprising a longitudinal bend of non-uniform severity and a transverse bend of non-uniform severity.

References Cited
UNITED STATES PATENTS

| | | | |
|---|---|---|---|
| 2,111,392 | 3/1938 | Galey | 65—273 |
| 2,348,278 | 5/1944 | Boyles et al. | 65—288 |
| 2,450,297 | 9/1948 | Pearse et al. | 65—288 |
| 2,452,488 | 10/1948 | Paddock et al. | 65—288 |
| 2,671,987 | 3/1954 | Jendrisak | 65—273 |
| 2,720,729 | 10/1955 | Rugg | 65—288 |
| 3,089,319 | 5/1963 | Carson et al. | 65—288 |

DONALL H. SYLVESTER, *Primary Examiner.*

M. O. WOLK, *Examiner.*

F. W. MIGA, *Assistant Examiner.*